(12) United States Patent
Fu et al.

(10) Patent No.: US 10,798,764 B2
(45) Date of Patent: Oct. 6, 2020

(54) METHOD AND APPARATUS FOR ALLOCATING RESOURCE ON PC5 INTERFACE

(71) Applicant: China Academy of Telecommunications Technology, Beijing (CN)

(72) Inventors: Jing Fu, Beijing (CN); Chandrika Kumudinie Worrall, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/098,874

(22) PCT Filed: May 3, 2017

(86) PCT No.: PCT/CN2017/082934
§ 371 (c)(1),
(2) Date: Nov. 5, 2018

(87) PCT Pub. No.: WO2017/190662
PCT Pub. Date: Nov. 9, 2017

(65) Prior Publication Data
US 2019/0141764 A1 May 9, 2019

(30) Foreign Application Priority Data

May 5, 2016 (CN) .......................... 2016 1 0294398

(51) Int. Cl.
*H04W 76/14* (2018.01)
*H04W 88/04* (2009.01)
(Continued)

(52) U.S. Cl.
CPC ............. *H04W 76/14* (2018.02); *H04W 8/08* (2013.01); *H04W 28/0257* (2013.01);
(Continued)

(58) Field of Classification Search
CPC . H04W 76/14; H04W 72/04; H04W 28/0268; H04W 28/0257; H04W 8/08;
(Continued)

(56) References Cited

U.S. PATENT DOCUMENTS

| 2009/0225719 A1* | 9/2009 | Zhi ...................... H04W 72/12 370/329 |
| 2013/0114497 A1* | 5/2013 | Zhang ................. H04W 72/005 370/312 |

(Continued)

FOREIGN PATENT DOCUMENTS

| CN | 101998520 A | 3/2011 |
| CN | 104869526 A | 8/2015 |

(Continued)

OTHER PUBLICATIONS

"3rd Generation Partnership Project; Technical Specification Group Services and System Aspects; Study on architecture enhancements for LTE support of V2X services (Release 14)", 3GPP Standard; 3GPP TR 23.785, 3rd Generation Partnership Project (3GPP) ,Mobile Competence Centre, 650, Route Des Lucioles , F-06921 Sophia-Antipolis Cedex; France, vol. SA WG2 , No. V0. 3.0, Apr. 19, 2016 (Apr. 19, 2016), pp. 1-37, XP051088569.

(Continued)

*Primary Examiner* — Mohamed A Kamara
(74) *Attorney, Agent, or Firm* — Kilpatrick Townsend & Stockton, LLP

(57) ABSTRACT

Disclosed are a method and apparatus for allocating a resource on a PC5 interface, comprising: acquiring a PC5 aggregation maximum bit rate of a user equipment; and after receiving a request for allocating a resource on a PC5 interface for the user equipment, allocating the resource on the PC5 interface according to the PC5 aggregation maximum bit rate of the user equipment. According to the present application, when a plurality of user equipment use a PC5

(Continued)

interface to perform communication, the solution of controlling, on the PC5, the total resources used by a UE on the PC5 interface can be provided, thus better controlling the service quality on the PC5 interface, and making up for the shortcomings of the prior art.

16 Claims, 3 Drawing Sheets

(51) Int. Cl.
      *H04W 72/04*     (2009.01)
      *H04W 76/18*     (2018.01)
      *H04W 8/08*      (2009.01)
      *H04W 28/02*     (2009.01)
      *H04W 8/00*      (2009.01)
      *H04W 92/18*     (2009.01)

(52) U.S. Cl.
      CPC ....... *H04W 28/0268* (2013.01); *H04W 72/04* (2013.01); *H04W 76/18* (2018.02); *H04W 8/005* (2013.01); *H04W 72/0406* (2013.01); *H04W 72/0493* (2013.01); *H04W 88/04* (2013.01); *H04W 92/18* (2013.01)

(58) Field of Classification Search
      CPC ............. H04W 76/18; H04W 72/0493; H04W 72/0406; H04W 8/005; H04W 92/18; H04W 88/04; H04W 8/20; H04W 72/08; H04W 72/048
      See application file for complete search history.

(56) References Cited

U.S. PATENT DOCUMENTS

2015/0189637 A1*  7/2015  Zhou ..................... H04W 76/25
                                                                  370/231
2017/0295567 A1  10/2017  Chen et al.
2017/0303322 A1* 10/2017  Watfa ..................... H04W 76/14

FOREIGN PATENT DOCUMENTS

| | | |
|---|---|---|
| WO | 2015141165 A1 | 9/2015 |
| WO | 2015141565 A1 | 9/2015 |
| WO | 2015/147605 A1 | 10/2015 |
| WO | 2015169148 A1 | 11/2015 |
| WO | 2016054577 A2 | 4/2016 |

OTHER PUBLICATIONS

Huawei et al: "QoS architecture for PC5 based V2X messages", 3GPP Draft; S2-161943 1648 QOS for PC5 Based V2X-V7, 3rd Generation Partnership Project {3GPP), Mobile Competence Centre; 650, Route Des Lucioles; F-06921 Sophia-Antipolis Cedex; France, vol. SA WG2, No. Sophia Antipolis, France; Apr. 11, 2016-Apr. 15, 2016, Apr. 16, 2016 (Apr. 16, 2016), XP051092038.

* cited by examiner

METHOD AND APPARATUS FOR ALLOCATING RESOURCE ON PC5 INTERFACE

This application is a US National Stage of International Application No. PCT/CN2017/082934, filed on May 3, 2017, designating the United States, and claiming the benefit of Chinese Patent Application No. 201610294398.3, filed with the Chinese Patent Office on May 5, 2016, and entitled "Method and apparatus for allocating a resource on a PC5 interface", which is hereby incorporated by reference in its entirety.

FIELD

The present application relates to the field of wireless communications, and particularly to a method and apparatus for allocating a resource on a PC5 interface.

BACKGROUND

In future development of mobile communication systems, in order to better satisfy a user demand, and to improve the efficiency of exchanging information between devices, the PC5 interface has been introduced between one device and another device. The existing PC5 interface has been applicable to Device to Device (D2D) Discovery, D2D communication, and Vehicle to Everything (V2X) communication.

In order to improve the transmission efficiency of a network, and to lower power consumption of a User Equipment (UE), the PC5 interface is introduced between one UE and another UE; and FIG. 1 illustrates a schematic diagram of the position of the PC5 interface, and as illustrated in FIG. 1, the PC5 interface is applicable to D2D communication and V2X communication.

Also in order to extend a coverage area of the network, etc., a relay is introduced between a UE and the network (NW). FIG. 2 is a schematic diagram of a relay in V2X communication, and as illustrated in FIG. 2, a Road Side Unit (RSU) operates as a relay to pass uplink (UL) data between a vehicle and the network, where the vehicle communicates with the relay via the PC5 interface, and the relay communicates with the network via a Uu interface. The UE1 is connected with the UE2 over a Side-Link (SL) shared channel.

As there are a variety of services, the various services shall be carried concurrently via the PC5 interface by setting up a plurality of bearers, and for example, there may be different types of services including voice, video, etc., in D2D communication. A priority management mechanism is introduced to D2D communication in the 3GPP R13 particularly as follows.

A priority is defined for each Proximity-based Service (ProSe) data packet, and there are eight levels of Priority Per ProSe Packet (PPPP). For D2D communication in the mode 1 (i.e., a resource is scheduled by a base station), the base station side configures a correspondence relationship between a PPPP and a Logical Channel Group (LCG) ID based on LE via. Radio Resource Control (RRC) signaling; and for D2D communication in the mode 2 (i.e. a resource is allocated from resource pools as a result of contention), the base station side configures the resource pools by configuring each resource pool with one or more PPPPs, and the UE side selects a pool according to a PPPP at the highest logical channel priority in its Media Access Control Protocol Data Unit (MAC PDU). If a PPPP corresponds to a plurality of pools, then which pool will be selected dependent upon an implementation of the UE.

However a drawback in the prior art lies in that when there are a plurality of UEs communicating via the PC5 interface in the network, there is absent in the prior art a mechanism for and a solution to controlling a UE to access a resource on the PC5 interface.

SUMMARY

Embodiments of the application provide a method and apparatus for allocating a resource on a PC5 interface so as to provide a solution to accessing a resource on the PC5 interface when there are a plurality of UEs communicating via the PC5 interface.

An embodiment of the application provides a method for allocating a resource on a PC5 interface, the method including: obtaining a PC5 Aggregated Maximum Bit Rate (AgMBR) of a UE; and allocating a resource on the PC5 interface according to the PC5 AgMBR of the UE upon reception of a request for allocating a resource on the PC5 interface to the UE.

In an implementation, obtaining the PC5 AgMBR of the UE when context information of the UE is obtained by an eNB through an Mobility Management Entity (MME); and allocating the resource on the PC5 interface according to the PC5 AgMBR of the UE after the request for allocating a resource on the PC5 interface to the UE is received on the eNB.

In an implementation, obtaining the PC5 AgMBR of the UE in an LTE procedure by an eNB; and allocating the resource on the PC5 interface according to the PC5 AgMBR of the UE after the request for allocating a resource on the PC5 interface to the UE is received, and the resource on the PC5 interface allocated to the UE is used for the UE to set up a bearer through a relay UE.

In an implementation, the request for allocating a resource on the PC5 interface for the UE is transmitted by the UE or the relay UE.

In an implementation, the method further includes: determining bearer rates having been set up, according to Quality of Service (QoS) parameters of PC5 bearers which having set up by the UE, and determining a bearer rate to be set up, according to the request for allocating a resource on the PC5 interface to the UE; and when the resource is allocated according to the PC5 AgMBR of the UE, allocating the resource according to the bearer rates which having set up, the bearer rate to be set up, and the PC5 AgMBR of the UE.

In an implementation, the method further includes: if a sum of the bearer rates having been set up, and the bearer rate to be set up is greater than the AgMBR, then returning a rejection reason after the request for allocating a resource on the PC5 interface for the UE is rejected, or releasing a PC5 bearer having been set up with a low priority, after the request for allocating a resource on the PC5 interface to the UE is accepted.

In an implementation, the method further includes: passing the PC5 AgMBR to the relay UE if there is no PC5 bearer which has been set up between the UE and the relay UE.

In an implementation, obtaining the PC5 AgMBR of the UE from information passed by an eNB to a relay UE; and allocating by the relay UE the resource on the PC5 interface according to the PC5 AgMBR of the UE.

In an implementation, the resource on the PC5 interface is allocated by the relay UE according to the PC5 AgMBR of the UE among a resource on the PC5 interface allocated by the eNB to the relay UE.

In an implementation, the method further includes: allocating a resource on the PC5 interface to a relay UE, and instructing the relay UE to allocate a resource on the PC5 interface to the UE among the resource on the PC5 interface allocated to the relay UE according to the PC5 AgMBR.

An embodiment of the application provides an apparatus for allocating a resource on a PC5 interface, the apparatus including: an obtaining device configured to obtain a PC5 AgMBR of a UE; and an allocating device configured to allocate a resource on the PC5 interface according to the PC5 AgMBR of the UE upon reception of a request for allocating a resource on the PC5 interface to the UE.

In an implementation, the obtaining device is further configured to obtain the PC5 AgMBR of the UE when context information of the UE is obtained by an eNB through an MME; and the allocating device is further configured to allocate a resource on the PC5 interface according to the PC5 AgMBR of the UE after the request for allocating a resource on the PC5 interface to the UE is received by the eNB.

In an implementation, the obtaining device is configured to obtain the PC5 AgMBR of the UE in an LIE procedure at an eNB side; and the allocating device is configured to allocate the resource on the PC5 interface according to the PC5 AgMBR of the UE after the request for allocating a resource on the PC5 interface to the UE is received, and the resource on the PC5 interface allocated to the UE is used for the UE to set up a bearer through a relay UE.

In an implementation, the allocating device is configured to receive the request for allocating a resource on the PC5 interface to the UE, transmitted by the UE or the relay UE.

In an implementation, the allocating device is further configured to: determine bearer rates having been set up, according to QoS parameters of PC5 bearers having been set up by the UE, and determine a bearer rate to be set up, according to the request for allocating a resource on the PC5 interface to the UE; and when the resource is allocated according to the PC5 AgMBR of the UE, allocate the resource according to the bearer rates having been set up, the bearer rate to be set up, and the PC5 AgMBR of the UE.

In an implementation, the allocating device is further configured to: if a sum of the bearer rates having been set up, and the bearer rate to be set up is greater than the AgMBR, return a rejection reason after the request for allocating a resource on the PC5 interface to the UE is rejected, or release one of the PC5 bearers having been set up with a low priority, after the request for allocating a resource on the PC5 interface for the UE is accepted.

In an implementation, the allocating device is further configured to pass the PC5 AgMBR to the relay UE if there is no PC5 bearer having been set up between the UE and the relay UE.

In an implementation, the allocating device is configured to obtain the PC5 AgMBR of the UE from information passed by an eNB to a relay UE, and to allocate at the relay UE side the resource on the PC5 interface according to the PC5 AgMBR of the UE.

In an implementation, the allocating device is configured to allocate at the relay UE side a resource on the PC5 interface according to the PC5 AgMBR of the UE among a resource on the PC5 interface allocated by the eNB to the relay UE.

In an implementation, the allocating device is configured to: allocate a resource on the PC5 interface to a relay UE, and instruct the relay UE to allocate a resource on the PC5 interface to the UE among the resource on the PC5 interface allocated to the relay UE according to the PC5 AgMBR.

An embodiment of the application provides a network-side device including: a processor, a memory, and a transceiver, and: the processor is configured to read and execute program in the memory to: allocate a resource on a PC5 interface according to a PC5 AgMBR of a UE after the transceiver receives a request for allocating a resource on the PC5 interface to the UE; and the transceiver is configured to transmit and receive data under the control of the processor to: obtain the PC5 AgMBR of the UE.

In the solutions according to the embodiments of the application, since a resource on the PC5 interface is allocated according to the PC5 AgMBR of the UE upon reception of a request for allocating a resource on the PC5 interface to the UE, such a solution is provided that the total amount of resources accessed by the UE on the PC5 interface is controlled when there are a plurality of UEs communicating via the PC5 interface, thus bettering controlling a quality of service on the PC5 interface, and addressing the drawback in the prior art.

BRIEF DESCRIPTION OF THE DRAWINGS

The drawings described here are intended to provide further understanding of the application, and constitute a part of the specification, and the exemplary embodiments of the application, and the description thereof are intended to set forth the application, but not intended to limit the application unduly.

DETAILED DESCRIPTION OF THE EMBODIMENTS

For some UE, a plurality of services may be transmitted via a PC5 interface by setting up a plurality of bearers. When there are a plurality of UEs communicating via the PC5 interface in a network, there has been absent in the prior art a corresponding mechanism for controlling a UE to access a resource on the PC5 interface. In view of this, the embodiments of the application provide a solution to controlling a QoS on a PC5 interface so as to better control the quality of service on the PC5 interface generally by controlling the total amount of resources accessed by the UE on the PC5 interface according to a subscription parameter of the UE, i.e., an AgMBR. Particular implementations of the application will be described below with reference to the drawings.

In an implementation, a resource on a PC5 interface can be allocated by an evolved Node B (eNB) or a relay UE, but when the resource is allocated by the relay UE, the eNB will cooperate thereon accordingly, so in the following description, an implementation at the eNB side or the relay UE side will be described, and an embodiment with cooperation of the eNB and the relay UE will also be described to better understand the implementation of the solution provided according to the embodiments of the application. But this will not suggest required cooperation of both the sides for an implementation or suggest required separate implementation by each of the sides.

Figure 1:
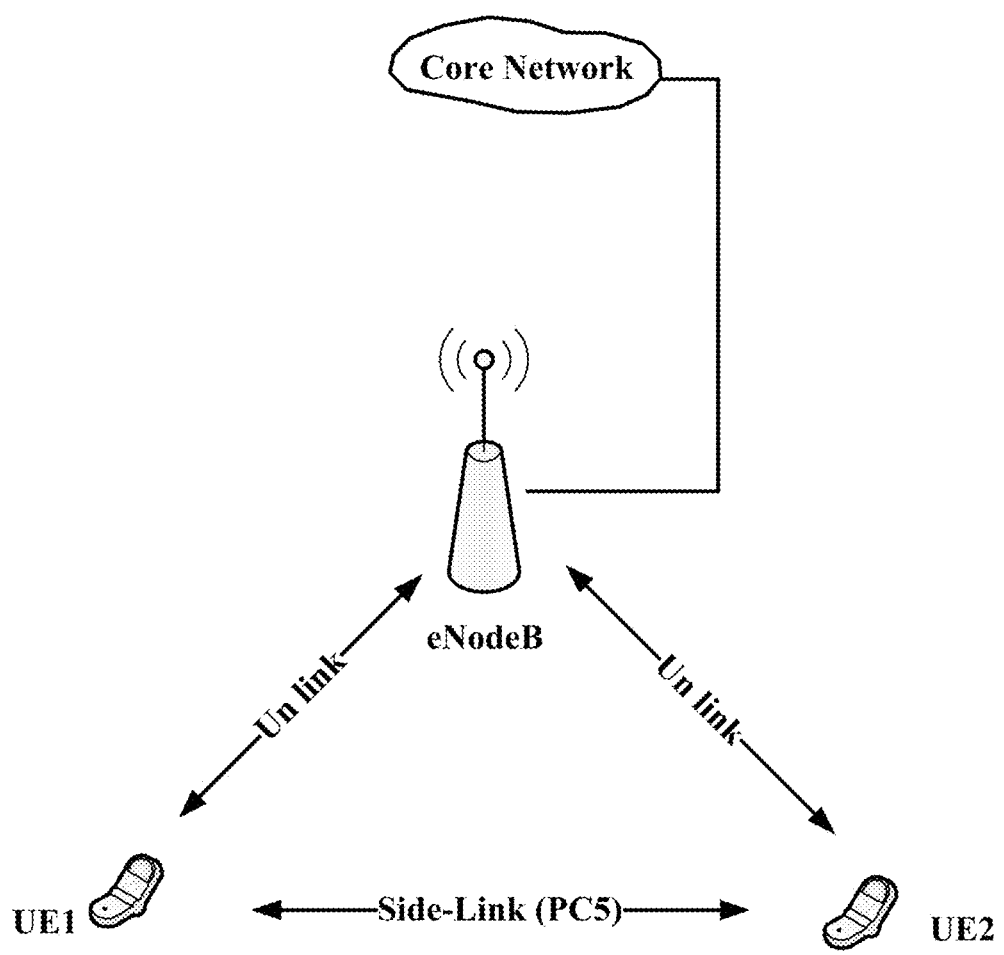
FIG. 1 is a schematic diagram of the position of the PC5 interface in the background of the application.
Figure 2:
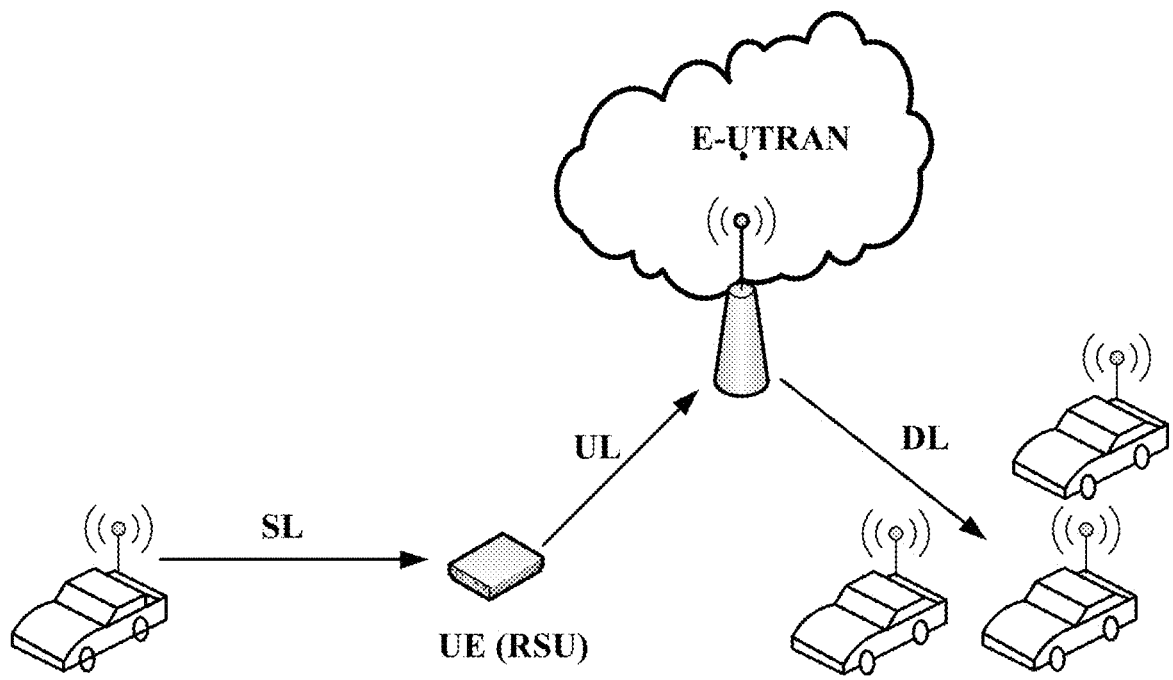
FIG. 2 is a schematic diagram of the relay in V2X communication in the background of the application.
Figure 3:
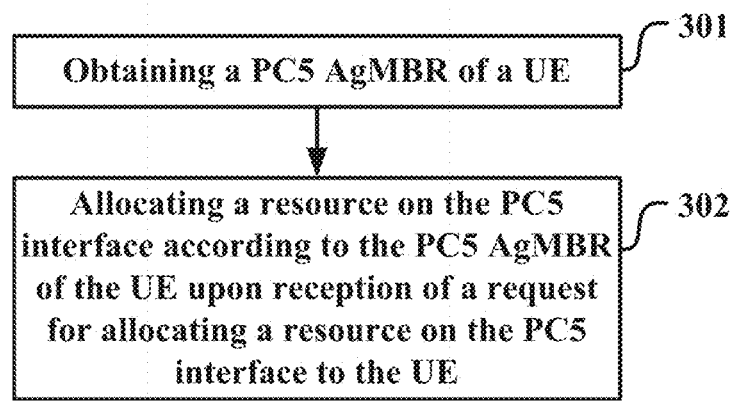
FIG. 3 is a schematic flow chart of a method for allocating a resource on a PC5 interface according to an embodiment of the application.

FIG. 3 is a schematic flow chart of a method for allocating a resource on a PC5 interface according to an embodiment of the application, and as illustrated, the method can include the following operations.

Operation 301: obtaining a PC5 AgMBR of a UE.

Operation 302: allocating a resource on the PC5 interface according to the PC5 AgMBR of the UE upon reception of a request for allocating a resource on the PC5 interface to the UE.

In an implementation in which a QoS on the PC5 interface is controlled, the obtained PC5 AgMBR is a subscription parameter from the UE, so that the total amount of resources accessed by the UE on the PC5 interface can be controlled according to the subscription parameter PC5 AgMBR of the UE. In a particular implementation, the eNB can obtain the subscription parameter PC5 AgMBR of the UE in the existing Long Term Evolution (LTE) procedure. The total sum of the maximum transmitting rate of all the bearers when the UE transmits via the PC5 interface is limited to the parameter PC5 AgMBR. In a particular implementation, the PC5 AgMBR can be a subscription parameter from the UE, but can be obtained otherwise, that is, the PC5 AgMBR may be obtained from another source as long as the parameter is used for limiting the total sum of the maximum transmitting rate of all the bearers when the UE transmits via the PC5 interface, and can be used for controlling the total amount of resources accessed by the UE on the PC5 interface. In an implementation, a PC5 AgMBR from a subscription parameter will be described by way of an example, but not intended to limit that the PC5 AgMBR can only from the subscription parameter. In fact, the parameter can be obtained as needed in practice in an implementation.

Particularly when the eNB controls the allocation of a resource on the PC5 interface, the eNB can allocate a PC5 resource to the UE according to the subscription parameter PC5 AgMBR of the UE.

If there is a relay UE, then the relay UE may control a PC5 resource to be allocated to the UE, and when the relay UE controls the allocation of a resource on the PC5 interface, the eNB controls a PC5 bearer to be set up between the UE and the relay UE according to the parameter PC5 AgMBR, so when the relay UE particularly schedules the UE, the relay UE allocates the resource to the UE according to the parameter PC5 AgMBR.

In one embodiment, the eNB can control the total amount of PC5 resources allocated to the relay UE, and when the relay UE particularly controls the scheduling of a PC5 resource, the eNB passes the parameter PC5 AgMBR of some UE to the relay UE; and when the eNB allocates the resource, it shall consider that the total amount of PC5 resources allocated to the relay UE does not exceed a total AgMBR (the sum of AgMBRs of a plurality of UEs), and when the relay UE schedules the UE, it shall consider the parameter AgMBR.

A particular implementation will be described below by way of an example.

First Embodiment

In this embodiment, an eNB allocates a PC5 resource for a UE according to the PC5 AgMBR, and particularly the eNB controls the allocation of a resource on the PC5 interface between the UE and another UE, and between the UE and the relay UE, that is: the eNB obtains the subscription parameter PC5 AgMBR of the UE when context information of the UE is obtained through an MME; and the eNB allocates a resource on the PC5 interface according to the PC5 AgMBR of the UE after the request for allocating a resource on the PC5 interface from the UE is received.

Particularly as follows.

1. The eNB obtains the subscription parameter PC5 AgMBR of the UE in the existing LTE procedure, and stores it; and for example, when the eNB obtains context information of the UE through an MME, the context information of the UE includes the parameter PC5 AgMBR, and this parameter limits the total sum of the maximum transmitting rate of all the bearers when the UE transmits via the PC5 interface.

2. When the eNB receives a request of the UE for allocating a PC5 resource, the eNB takes into account the PC5 AgMBR when configuring a PC5 transmission resource, so that the total amount of resources allocated to the UE does not exceed the PC5 AgMBR, and for example, when a dynamic dedicate resource is allocated, the total amount of resource allocated to the UE shall be considered to not exceed the PC5 AgMBR; and when pools of transmit resources are allocated, an appropriate total amount of resource pools is allocated so that the total amount of resources allocated to the UE does not exceed the PC5 AgMBR.

Second Embodiment

In this embodiment, an eNB controls a bearer of UE set up through a relay UE according to the parameter PC5 AgMBR, and the relay UE controls the allocation of a resource on a PC5 interface.

At the eNB side: the eNB obtains the subscription parameter PC5 AgMBR of the UE in an LTE procedure; and after a request for allocating a resource on the PC5 interface to the UE is received, the eNB allocates a resource on the PC5 interface according to the PC5 AgMBR of the UE, where the resource on the PC5 interface allocated to the UE is used for the UE to set up a bearer through a relay UE.

In an implementation, the request for allocating a resource on the PC5 interface to the UE can be transmitted by the UE or the relay UE.

In an implementation, the method can further include: determining bearer rates which have been set up according to QoS parameters of PC5 bearers which have been set up by the UE, and determining a bearer rate to be set up according to the request for allocating a resource on the PC5 interface to the UE; and when the resource is allocated according to the PC5 AgMBR of the UE, allocating the resource according to the bearer rates having been set up, the bearer rate to be set up, and the PC5 AgMBR of the UE.

In an implementation, the method can further include: if the sum of the bearer rates which have been set up, and the bearer rate to be set up is greater than the AgMBR, then a rejection reason will be returned after the request for allocating a resource on the PC5 interface for the UE is rejected, or a PC5 bearer which has been set up with a low priority will be released after the request for allocating a resource on the PC5 interface to the UE is accepted.

In an implementation, the method can further include: if there is no PC5 bearer which has been set up between the UE and the relay UE, then the PC5 AgMBR will be passed to the relay UE.

In the case that the eNB passes the PC5 AgMBR to the relay UE, correspondingly at the relay UE side: obtaining the subscription parameter PC5 AgMBR of the UE from information transmitted by the eNB to the relay UE; and allocating a resource on the PC5 interface by the relay UE according to the PC5 AgMBR of the UE.

Particularly as follows.

1. The eNB obtains the subscription parameter PC5 AgMBR of the UE in the existing LTE procedure, and stores it.

2. Upon reception of a request for setting up some bearer to the UE through the relay UE (this request can be obtained from the UE or the relay UE), the eNB determines whether the sum of minimum rate of all the bearers after the bearer is set up is less than or equal to the sum of rate required in the parameter PC5 AgMBR, according to a parameter PC5 AgMBR in the context of the UE, QoS parameters of PC5 bearers of the UE which have been set up (the QoS parameters include bearer rates to be provided for the respective bearers), and QoS parameters of PC5 bearers of the UE to be set up (the QoS parameters include bearer rates to be provided ilk for the respective bearers).

If so, then the eNB will accept the request for setting up the bearer for the UE.

Otherwise, the eNB will reject the request for setting up the bearer for the UE, and may carry a rejection reason (that the sum of minimum rate of all the bearers is greater than the sum of maximum PC5 transmitting rate, for example) in a rejection message; or if the priority of the bearer to be set up as requested is higher according to a QoS parameter, then the eNB will accept the request for setting up the bearer for the UE, and release some bearer, which has been set up, with a lower priority.

3. If there is no bearer which has been set up between the UE and the relay UE, then the eNB will pass the parameter AgMBR to the relay UE. The relay UE is responsible for allocating a PC5 resource between the UE and the relay UE, so when the UE is scheduled via the PC5 interface, the total amount of resources allocated to the UE does not exceed the PC5 AgMBR.

Third Embodiment

In this embodiment, an eNB is responsible for allocating all the PC5 resources, and a relay UE particularly controls the scheduling of PC5 resources; and particularly the eNB is responsible for allocating a total amount of PC5 resources accessible to the relay UE, and the relay UE particularly controls the scheduling of a PC5 resource.

That is, at the eNB side: allocating a resource on the PC5 interface to the relay UE, and instructing the relay UE to allocate a resource on the PC5 interface to the UE among the allocated resource on the PC5 interface according to the PC5 AgMBR.

At the relay UE side: obtaining the subscription parameter PC5 AgMBR of the UE from information passed by the eNB to the relay UE; and allocating a resource on the PC5 interface by the relay UE according to the PC5 AgMBR of the UE.

In an implementation, a resource on the PC5 interface is allocated by the relay UE according to the PC5 AgMBR of the UE among the resource on the PC5 interface allocated by the UE to the relay UE.

Particularly as follows.

1. The eNB obtains the subscription parameter PC5 AgMBR of some UE in the existing LTE procedure, and stores it.

2. The relay UE obtains the parameter PC5 AgMBR of the UE through the eNB, and stores it.

The relay UE can obtain the parameter by setting up a related relay link with the UE, or can obtain the parameter by requesting it from the eNB after the UE interacts with the relay UE, particularly as needed in reality.

3. When the eNB allocates a PC5 resource accessible to the relay UE, the sum of PC5 AgMBR of all the UEs connected with the current relay UE is considered so that the amount of PC5 resources allocated to the relay UE does not exceed the sum of AgMBR.

4. When the relay UE schedules some UE, the AgMBR of the UE is considered so that the total amount of resources allocated to the UE does not exceed the PC5 AgMBR, and for example, when a dynamic dedicate resource is allocated, it shall be considered that the total amount of resources allocated to the UE does not exceed the PC5 AgMBR; and when pools of transmit resources are allocated, an appropriate total amount of resource pools is allocated.

Based upon the same inventive idea, an embodiment of the application further provides an apparatus for allocating a resource on a PC5 interface, and since the apparatus addresses the problem under a similar principle to the method for allocating a resource on a PC5 interface, reference can be made to the implementation of the method for an implementation of the apparatus, and a repeated description thereof will be omitted here.

Figure 4:
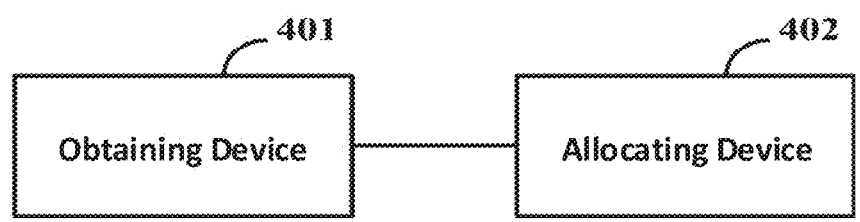
FIG. 4 is a schematic structural diagram of an apparatus for allocating a resource on a PC5 interface according to an embodiment of the application.

FIG. 4 is a schematic structural diagram of an apparatus for allocating a resource on a PC5 interface according to an embodiment of the application, and as illustrated, the apparatus can include: an obtaining device 401 configured to obtain a subscription parameter PC5 AgMBR of a UE; and an allocating device 402 configured to allocate a resource on the PC5 interface according to the PC5 AgMBR of the UE upon reception of a request for allocating a resource on the PC5 interface to the UE.

In an implementation, the obtaining device is further configured to obtain the subscription parameter PC5 AgMBR of the UE when context information of the UE is obtained by an eNB through an MME; and the allocating device is further configured to allocate the resource on the PC5 interface according to the PC5 AgMBR of the UE after the request for allocating a resource on the PC5 interface to the UE is received by the eNB.

In an implementation, the obtaining device is further configured to obtain the subscription parameter PC5 AgMBR of the UE in an UE procedure at an eNB side; and the allocating device is further configured to allocate the resource on the PC5 interface according to the PC5 AgMBR of the UE after the request for allocating a resource on the PC5 interface to the UE is received, where the resource on the PC5 interface allocated to the UE is used for the UE to set up a bearer through a relay UE.

In an implementation, the allocating device is further configured to receive the request for allocating a resource on the PC5 interface to the UE, transmitted by the UE or the relay UE.

In an implementation, the allocating device is further configured to: determine bearer rates which have been set up, according to QoS parameters of PC5 bearers which have been set up by the UE, and determine a bearer rate to be set up, according to the request for allocating a resource on the PC5 interface to the UE; and when the resource is allocated according to the PC5 AgMBR of the UE, allocate the resource according to the bearer rates which have been set up, the bearer rate to be set up, and the PC5 AgMBR of the UE.

In an implementation, the allocating device is further configured to: if a sum of the bearer rates which have been set up, and the bearer rate to be set up is greater than the AgMBR, return a rejection reason after the request for allocating a resource on the PC5 interface to the UE is rejected, or release a PC5 bearer which has been set up with a low priority, after the request for allocating a resource on the PC5 interface to the UE is accepted.

In an implementation, the allocating device is further configured to pass the PC5 AgMBR to the relay UE if there is no PC5 bearer which has been set up between the UE and the relay UE.

In an implementation, the allocating device is further configured to: obtain the subscription parameter PC5 AgMBR of the UE from information passed by an eNB to a relay UE, and allocate at the relay UE side a resource on the PC5 interface according to the PC5 AgMBR of the UE. At this time, the allocating device can be located in the relay UE.

In an implementation, the allocating device is further configured to allocate at the relay UE a resource on the PC5 interface according to the PC5 AgMBR of the UE among a resource on the PC5 interface allocated by the eNB to the relay UE.

In an implementation, the allocating device is further configured to: allocate a resource on the PC5 interface to a relay UE, and instruct the relay UE to allocate a resource on the PC5 interface to the UE among the resource on the PC5 interface allocated to the relay UE according to the PC5 AgMBR.

Figure 5:
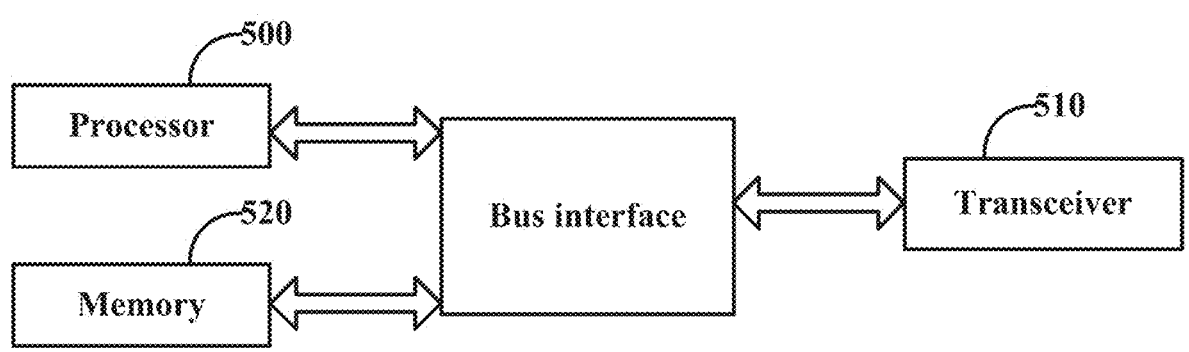
FIG. 5 is a schematic structural diagram of a network-side device according to an embodiment of the application.

FIG. 5 is a schematic structural diagram of a network-side device, which can be an eNB or a relay UE as needed in an implementation, and as illustrated, the network-side device can include: a processor 500 configured to read and execute program in a memory 520 to: allocate a resource on a PC5 interface according to a subscription parameter PC5 AgMBR of a UE upon reception of a request for allocating a resource on the PC5 interface to the UE; and a transceiver 510 configured to transmit and receive data under the control of the processor 500 to: obtain the PC5 AgMBR of the UE.

In an implementation, the processor is configured to: obtain the subscription parameter PC5 AgMBR of the UE when context information of the UE is obtained by an eNB through an MME; and allocate a resource on the PC5 interface according to the PC5 AgMBR of the UE after the request for allocating a resource on the PC5 interface to the UE is received by the eNB.

In an implementation, the processor is configured to: obtain the subscription parameter PC5 AgMBR of the UE in an LTE procedure at an eNB side; and allocate a resource on the PC5 interface according to the PC5 AgMBR of the UE after a request for allocating a resource on the PC5 interface to the UE is received, where the resource on the PC5 interface allocated to the UE is used for the UE to set up a bearer through a relay UE.

In an implementation, the transceiver is configured to receive the request for allocating a resource on the PC5 interface for the UE, transmitted by the UE or the relay UE.

In an implementation, the processor is further configured to: determine bearer rates which have been set up, according to QoS parameters of PC5 bearers which have been set up by the UE, and determine a bearer rate to be set up, and according to the request for allocating a resource on the PC5 interface for the and when the resource is allocated according to the PC5 AgMBR of the UE, allocate the resource according to the bearer rates which have been set up, the bearer rate to be set up, and the PC5 AgMBR of the UE.

In an implementation, the processor is further configured to: if a sum of the bearer rates which have been set up, and the bearer rate to be set up is greater than the AgMBR, instruct the transceiver to return a rejection reason after the request for allocating a resource on the PC5 interface to the UE is rejected, or release a PC5 bearer which has been set up with a low priority, after the request for allocating a resource on the PC5 interface to the UE is accepted.

In an implementation, the processor is further configured to: instruct the transceiver to pass the PC5 AgMBR to the relay UE if there is no PC5 bearer which has been set up between the UE and the relay UE.

In an implementation, the processor is further configured to obtain the subscription parameter PC5 AgMBR of the UE from information passed by an eNB to a relay UE; and allocate at the relay UE side the resource on the PC5 interface according to the PC5 AgMBR of the UE.

In an implementation, the processor is configured to allocate at the relay UE side a resource on the PC5 interface according to the PC5 AgMBR of the UE among a resource on the PC5 interface allocated by the eNB to the relay UE.

In an implementation, the processor is further configured to: allocate a resource on the PC5 interface to a relay UE, and instruct the relay UE to allocate a resource on the PC5 interface to the UE among the resource on the PC5 interface allocated to the relay UE according to the PC5 AgMBR.

Here in FIG. 5, the bus architecture can include any number of interconnecting buses and bridges to particularly link together various circuits including one or more processors represented by the processor 500, and one or more memories represented by the memory 520. The bus architecture can further link together various other circuits, e.g., a peripheral device, a manostat, a power management circuit, etc., all of which are well known in the art, so a further description thereof will be omitted in this context. The bus interface serves as an interface. The transceiver 510 can be a number of elements including a transmitter and a receiver which are units for communication with various other devices over a transmission medium. The processor 500 is responsible for managing the bus architecture and performing normal processes, and the memory 520 can store data for use by the processor 500 in performing the operations.

In summary, in the solution above, the total amount of resources accessed by the UE on the PC5 interface can be controlled according to the subscription parameter PC5 AgMBR (Aggregated MBR) of the UE particularly as follows.

When the eNB controls the allocation of a resource on the PC5 interface, the eNB allocates a PC5 resource to the UE according to the subscription parameter PC5 AgMBR of the UE.

When the relay UE controls actively the allocation of a resource on the PC5 interface, if there is a relay UE, then the eNB will control a PC5 bearer to be set up between the UE and the relay UE according to the parameter PC5 AgMBR, while the relay UE schedules the UE, it shall consider the parameter AgMBR.

The eNB controls the total amount of PC5 resources allocated to the relay UE, and when the relay UE particularly controls the scheduling of a PC5 resource, the eNB passes the parameter PC5 AgMBR of some UE to the relay UE; and when the eNB allocates the resource, it shall consider that the total amount of PC5 resources allocated to the relay UE does not exceed a total AgMBR (the sum of AgMBRs of a plurality of UEs), and when the relay UE schedules the UE, it shall consider the parameter AgMBR.

The solution above provides a solution to controlling a PC5 interface resource by controlling the total amount of resources accessed by a UE on a PC5 interface so that a quality of service on the PC5 interface can be better controlled.

Embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

The invention claimed is:

1. A method for allocating a resource on a PC5 interface, the method comprising:
    obtaining a PC5 Aggregated Maximum Bit Rate (AgMBR) of a User Equipment (UE); and
    allocating a resource on the PC5 interface according to the PC5 AgMBR of the UE upon reception of a request for allocating a resource on the PC5 interface to the UE; wherein:
    obtaining the PC5 AgMBR of the UE in a Long Term Evolution (LTE) procedure by an eNB; and
    allocating the resource on the PC5 interface according to the PC5 AgMBR of the UE after the request for allocating a resource on the PC5 interface to the UE is received, wherein the resource on the PC5 interface allocated to the UE is used for the UE to set up a bearer through a relay UE;
    wherein the method further comprises:
    determining bearer rates having been set up, according to Quality of Service (QoS) parameters of PC5 bearers having been set up by the UE, and determining a bearer rate to be set up, according to the request for allocating a resource on the PC5 interface to the UE; and
    when the resource is allocated according to the PC5 AgMBR of the UE, allocating the resource according to the bearer rates having been set up, the bearer rate to be set up, and the PC5 AgMBR of the UE.

2. The method according to claim 1, wherein:
    obtaining the PC5 AgMBR of the UE when context information of the UE is obtained by an evolved Node B (eNB) through a Mobility Management Entity (MME); and
    allocating the resource on the PC5 interface according to the PC5 AgMBR of the UE after the request for allocating a resource on the PC5 interface to the UE is received by the eNB.

3. The method according to claim 1, wherein the request for allocating a resource on the PC5 interface to the UE is transmitted by the UE or the relay UE.

4. The method according to claim 1, wherein the method further comprises:
    if a sum of the bearer rates having been set up, and the bearer rate to be set up is greater than the AgMBR, then returning a rejection reason after the request for allocating a resource on the PC5 interface to the UE is rejected, or releasing a PC5 bearer having been set up with a low priority, after the request for allocating a resource on the PC5 interface to the UE is accepted.

5. The method according to claim 1, wherein the method further comprises:
    passing the PC5 AgMBR to the relay UE if there is no PC5 bearer having been set up between the UE and the relay UE.

6. The method according to claim 1, wherein:
    obtaining the PC5 AgMBR of the UE from information passed by an eNB to a relay UE; and
    allocating by the relay UE the resource on the PC5 interface according to the PC5 AgMBR of the UE.

7. The method according to claim 6, wherein the resource on the PC5 interface is allocated by the relaying UE according to the PC5 AgMBR of the UE among a resource on the PC5 interface allocated by the eNB to the relay UE.

8. The method according to claim 1, wherein the method further comprises:
    allocating a resource on the PC5 interface to a relay UE, and instructing the relay UE to allocate a resource on the PC5 interface to the UE among the resource on the PC5 interface allocated to the relay UE according to the PC5 AgMBR.

9. A network-side device, comprising: a processor, a memory, and a transceiver, wherein:
    the processor is configured to read and execute programs in the memory to:
    allocate a resource on a PC5 interface according to a PC5 Aggregated Maximum Bit Rate (AgMBR) of a User Equipment (UE) after the transceiver receives a request for allocating a resource on the PC5 interface to the UE; and
    the transceiver is configured to transmit and receive data under the control of the processor to:
    obtain the PC5 AgMBR of the UE;
    obtain the PC5 AgMBR of the UE in a Long Term Evolution (LTE) at an eNB side; and
    allocate the resource on the PC5 interface according to the PC5 AgMBR of the UE after a request for allocating a resource on the PC5 interface to the UE is received, wherein the resource on the PC5 interface allocated to the UE is used for the UE to set up a bearer through a relay UE;

wherein the processor is configured to:

determine bearer rates having been set up, according to Quality of Service (QoS) parameters of PC5 bearers having been set up by the UE, and determine a bearer rate to be set up, according to the request for allocating a resource on the PC5 interface to the UE; and when the resource is allocated according to the PC5 AgMBR of the UE, allocate the resource according to the bearer rates having been set up, the bearer rate to be set up, and the PC5 AgMBR of the UE.

10. The device according to claim 9, wherein the processor is configured to obtain the PC5 AgMBR of the UE when context information of the UE is obtained by an evolved Node B (eNB) through a Mobility Management Entity (MME); and allocate the resource on the PC5 interface according to the PC5 AgMBR of the UE after the request for allocating a resource on the PC5 interface to the UE is received by the eNB.

11. The device according to claim 9, wherein the transceiver is configured to receive the request for allocating a resource on the PC5 interface to the UE, transmitted by the UE or the relay UE.

12. The device according to claim 9, wherein the processor is further configured to:

if a sum of the bearer rates having been set up, and the bearer rate to be set up is greater than the AgMBR, instruct the transceiver to return a rejection reason after the request for allocating a resource on the PC5 interface to the UE is rejected, or release a PC5 bearer having been set up with a low priority, after the request for allocating a resource on the PC5 interface to the UE is accepted.

13. The device according to claim 9, wherein the processor is further configured to:

instruct the transceiver to pass the PC5 AgMBR to the relay UE if there is no PC5 bearer having been set up between the UE and the relay UE.

14. The device according to claim 9, wherein the processor is configured to:

obtain the PC5 AgMBR of the UE from information passed by an eNB to a relay UE; and allocate at the relay UE side the resource on the PC5 interface according to the PC5 AgMBR of the UE.

15. The device according to claim 14, wherein the processor is configured to allocate at the relay UE side a resource on the PC5 interface according to the PC5 AgMBR of the UE among a resource on the PC5 interface allocated by the eNB to the relay UE.

16. The device according to claim 9, wherein the processor is configured to:

allocate a resource on the PC5 interface to a relay UE, and instruct the relay UE to allocate a resource on the PC5 interface to the UE among the resource on the PC5 interface allocated to the relay UE according to the PC5 AgMBR.

* * * * *